US011304155B2

United States Patent
Ryu et al.

(10) Patent No.: US 11,304,155 B2
(45) Date of Patent: *Apr. 12, 2022

(54) METHOD AND DEVICE FOR TRANSMITTING POWER HEADROOM INFORMATION IN COMMUNICATION SYSTEM

(71) Applicant: Samsung Electronics Co., Ltd., Suwon-si (KR)

(72) Inventors: Hyunseok Ryu, Yongin-si (KR); Jaewon Kim, Seoul (KR); Hyunkyu Yu, Suwon-si (KR); Sangwon Choi, Seoul (KR); Kuyeon Whang, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,834

(22) Filed: Dec. 4, 2020

(65) Prior Publication Data
US 2021/0092691 A1    Mar. 25, 2021

Related U.S. Application Data

(63) Continuation of application No. 16/496,320, filed as application No. PCT/KR2018/003378 on Mar. 22, 2018, now Pat. No. 10,863,454.

(30) Foreign Application Priority Data

Mar. 22, 2017   (KR) ................. 10-2017-0036277

(51) Int. Cl.
*H04L 1/02* (2006.01)
*H04W 52/36* (2009.01)
*H04B 7/06* (2006.01)

(52) U.S. Cl.
CPC ........ *H04W 52/365* (2013.01); *H04B 7/0623* (2013.01)

(58) Field of Classification Search
CPC . H04W 52/365; H04W 52/242; H04W 28/10; H04L 5/00; H04L 5/53;
(Continued)

(56) References Cited

U.S. PATENT DOCUMENTS 8,462,705 B2    6/2013    Kim et al.
8,514,957 B2    8/2013    Nammi et al.
(Continued)

FOREIGN PATENT DOCUMENTS

EP    3319376 A2    5/2018
EP    3522617 A1    8/2019
(Continued)

OTHER PUBLICATIONS

Supplementary European Search Report dated Dec. 10, 2020 in connection with European Application No. 18772605.4, 13 pages.
(Continued)

*Primary Examiner* — Khai Tran

(57) ABSTRACT

The present disclosure relates to a communication technique which combines IoT technology with a 5G communication system for supporting a higher data transfer rate than existing 4G systems, and a system thereof. The present disclosure can be applied to an intelligent service (for example, a smart home, a smart building, a smart city, a smart car or a connected car, and services related to health care, digital education, retail business, security and safety, etc.) on the basis of 5G communication technology and IoT-related technology. The present method provides a power headroom information transmission method of a terminal, the headroom information transmission method including: a step of determining whether to transmit second power headroom (Continued)

information, on the basis of information about each beam included in first power headroom information, in a wireless communication system supporting beamforming; and a step of transmitting the second power headroom information to a base station when the transmission of the second power headroom information is determined.

15 Claims, 12 Drawing Sheets

(58) Field of Classification Search
CPC . H04L 27/2646; H04L 5/9935; H04B 7/0617; H04B 7/0623; H04B 7/0695; H04B 7/0639
USPC .......................................... 375/267, 260, 262
See application file for complete search history.

(56) References Cited

U.S. PATENT DOCUMENTS

| | | | |
|---|---|---|---|
| 9,084,209 B2 | 7/2015 | Gaal et al. | |
| 9,756,583 B2 | 9/2017 | Hwang et al. | |
| 10,863,454 B2* | 12/2020 | Ryu | H04W 52/242 |
| 2010/0120446 A1 | 5/2010 | Gaal | |
| 2010/0272091 A1 | 10/2010 | Fabien et al. | |
| 2013/0064131 A1 | 3/2013 | Kwon et al. | |
| 2013/0176953 A1 | 7/2013 | Stern-Berkowitz et al. | |
| 2015/0382205 A1 | 12/2015 | Lee et al. | |
| 2017/0034789 A1 | 2/2017 | Kim et al. | |
| 2017/0034793 A1 | 2/2017 | Uchino et al. | |
| 2017/0142707 A1 | 5/2017 | Zhang et al. | |
| 2017/0245220 A1* | 8/2017 | Ouchi | H04W 52/242 |
| 2018/0132197 A1 | 5/2018 | Lin et al. | |
| 2019/0223117 A1 | 7/2019 | Chai et al. | |
| 2019/0268852 A1 | 8/2019 | Ryu et al. | |
| 2020/0120679 A1* | 4/2020 | Wang | H04W 72/0453 |
| 2021/0050963 A1* | 2/2021 | Zarifi | H04W 48/16 |
| 2021/0203456 A1* | 7/2021 | Zhao | H04B 7/0626 |

FOREIGN PATENT DOCUMENTS

| | | |
|---|---|---|
| JP | 5352798 B2 | 11/2013 |
| KR | 10-2011-0002067 A | 1/2011 |
| KR | 10-2012-0068953 A | 6/2012 |
| KR | 10-2013-0087036 A | 8/2013 |
| WO | 2014116928 A1 | 7/2014 |
| WO | 2015/152589 A1 | 10/2015 |

OTHER PUBLICATIONS

3GPP TS 36.321 V13.5.0 (Mar. 2017), Technical Specification, 3rd Generation Partnership Project; Technical Specification Group Radio Access Network; Evolved Universal Terrestrial Radio Access (E-UTRA); Medium Access Control (MAC) protocol specification (Release 13), 93 pages.
"3rd Generation Partnership Project; Technical Specification Group Radio Access Network; Physical layer Measurements (FDD) (Release 13)", 3GPP TS 25.215 V13.1.0, Jun. 30, 2016, 25 pages.
International Search Report dated Aug. 13, 2018 in connection with International Patent Application No. PCT/KR2018/003378, 3 pages.
Written Opinion of the International Searching Authority dated Aug. 13, 2018 in connection with International Patent Application No. PCT/KR2018/003378, 5 pages.
Korean Intellectual Property Office (KIPO), "Office Action" dated Sep. 30, 2021, in connection with counterpart Korean Patent Application No. 10-2017-0036277, 8 pages.

* cited by examiner

FIG. 5B

| $C_7$ | $C_6$ | $C_5$ | $C_4$ | $C_3$ | $C_2$ | $C_1$ | R |
|---|---|---|---|---|---|---|---|
| P | V | | | | | | |
| R | R | | | | | | |
| P | V | | | | | | |
| R | R | | | | | | |
| P | V | | | | | | |
| R | R | | | | | | |

| $C_7$ | $C_6$ | Content |
|---|---|---|
| P | V | PH (Type 2, PCell) |
| R | R | $P_{CMAX,c}\ 1$ |
| P | V | PH (Type 1, PCell) |
| R | R | $P_{CMAX,c}\ 2$ |
| P | V | PH (Type 1, SCell 1) |
| R | R | $P_{CMAX,c}\ 3$ |

. . .

| P | V | PH (Type 1, SCell n) |
|---|---|---|
| R | R | $P_{CMAX,c}\ m$ |

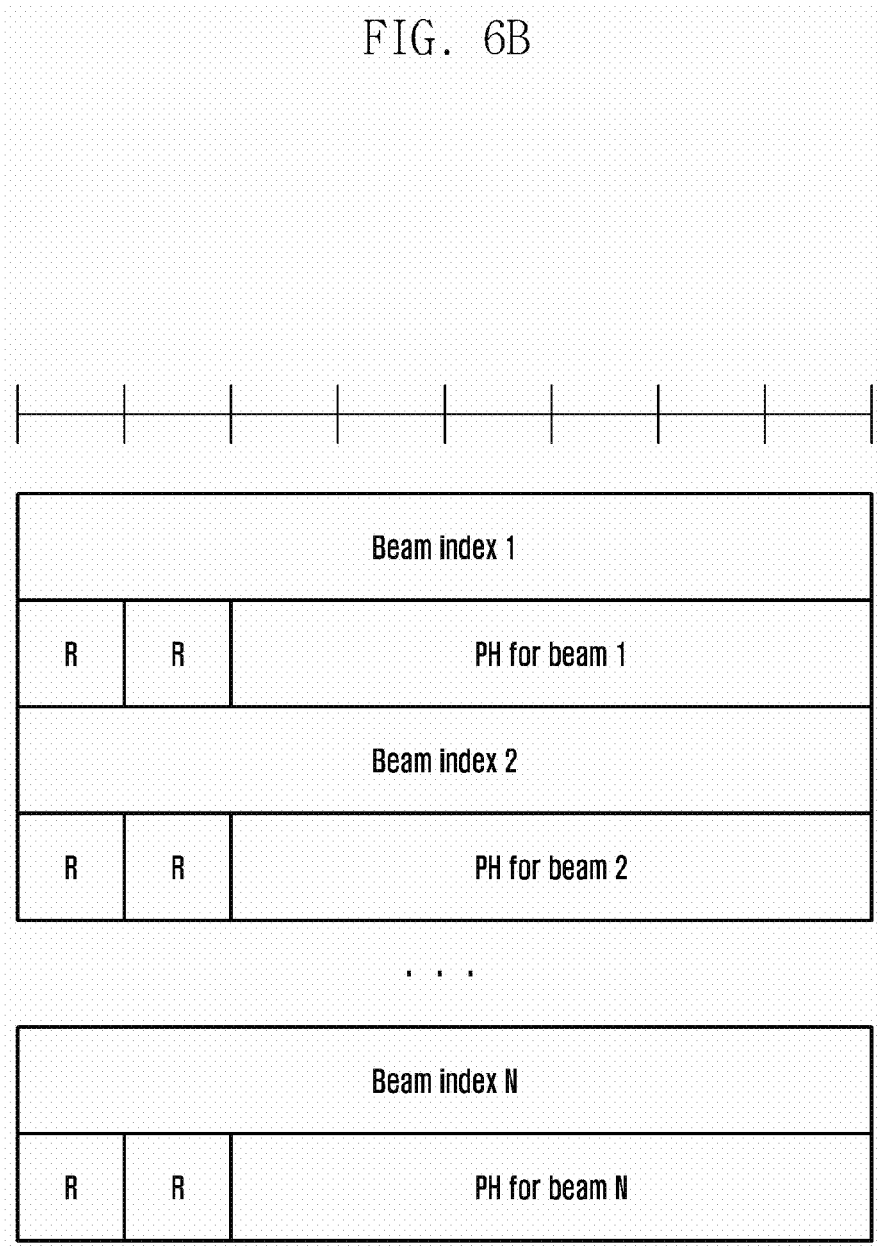

METHOD AND DEVICE FOR TRANSMITTING POWER HEADROOM INFORMATION IN COMMUNICATION SYSTEM

CROSS-REFERENCE TO RELATED APPLICATIONS

This application is a continuation of U.S. patent application Ser. No. 16/496,320 filed on Sep. 20, 2019, which is a 371 of International Application No. PCT/KR2018/003378 filed on Mar. 22, 2018, which claims priority to Korean Patent Application No. 10-2017-0036277 filed on Mar. 22, 2017, the disclosures of which are herein incorporated by reference in their entirety.

BACKGROUND

1. Field

The disclosure relates to a communication system and, more particularly, to a method and device for transmitting terminal power headroom information in a communication system.

2. Description of Related Art

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system. In order to accomplish a higher data transfer rate, the implementation of the 5G communication system in a super-high frequency (mmWave) band (e.g., about a 60 GHz band) is being considered. Also, in order to obviate a propagation loss of a radio wave and increase a delivery distance of a radio wave in the super-high frequency band, discussions for the 5G communication system are underway about various techniques such as a beamforming, a massive MIMO, a full dimensional MIMO (FD-MIMO), an array antenna, an analog beam-forming, and a large scale antenna. Additionally, for an improvement in network of the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like. Also, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

Meanwhile, the Internet, which is a human centered connectivity network where humans generate and consume information, is now evolving to the Internet of things (IoT) where distributed entities, such as things, exchange and process information without human intervention. Further, the Internet of everything (IoE), which is a combination of IoT technology and big data processing technology through connection with a cloud server, has emerged. As technology elements, such as sensing technology, wired/wireless communication and network infrastructure, service interface technology, and security technology, have been demanded for IoT implementation, a sensor network, machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected car, smart grid, health care, smart appliances, advanced medical service, etc. through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

Meanwhile, in the conventional LTE, a terminal transmits power headroom information to a base station through uplink. A power headroom value means a difference between the maximum transmission power of the terminal and the transmission power actually used for uplink transmission by the terminal. The base station may use the power headroom information received from the terminal in a method for optimizing system performance. For example, when the power headroom information received from the terminal is a positive value, the base station determines that the terminal is capable of increasing the uplink transmission power, and thus may increase the amount of resources allocated to the terminal at the time of scheduling for the terminal. On the contrary, when the power headroom information received from the terminal is a negative value, the base station determines that the terminal should reduce the uplink transmission power, and thus may decrease the amount of resources allocated to the terminal at the time of scheduling for the terminal. Through this operation, it is possible to secure the coverage of data (or control information) transmitted in the uplink and also reduce power consumption of the terminal.

This operation regarding transmission and reception of power headroom information between a base station and a terminal is also required in the 5G communication system using beamforming, so that a design for a method and device for transmitting power headroom information in a beamforming system is necessary.

Meanwhile, in the conventional LTE system, a discrete Fourier transform-spread-orthogonal frequency division multiplexing (DFT-S-OFDM) has been used as an uplink waveform. Contrary to this, in the 5G communication system, both DFT-S-OFDM and cyclic prefix-orthogonal frequency division multiplexing (CP-OFDM) may be used as uplink waveforms in order to maximize the flexibility of system operation. Because different waveforms have different characteristics, it is necessary to design a method and device for transmitting power headroom information in consideration of this point.

Embodiments of the disclosure are to provide an operating method and device for a terminal and a base station to transmit terminal power headroom information according to a beam variation in a beamforming system.

In addition, embodiments of the disclosure are to provide an operating method and device for a terminal and a base station to transmit terminal power headroom information according to a waveform in a system that uses different uplink waveforms.

SUMMARY

The disclosure provides a power headroom information transmission method of a terminal in a wireless communication system supporting beamforming, the method including determining whether to transmit second power headroom information, based on information about beams contained in first power headroom information, and transmitting the second power headroom information to a base station when transmission of the second power headroom information is determined.

The determining may include determining a first beam group including at least one beam having a signal strength greater than or equal to a first predetermined threshold value among the beams contained in the first power headroom information, checking a change in a path loss value of each beam belonging to the first beam group, and determining transmission of the second power headroom information when the change in the path loss value is greater than or equal to a predetermined threshold value.

The determining may include determining a second beam group including at least one beam having a signal strength smaller than or equal to a second predetermined threshold value among the beams contained in the first power headroom information, checking a change in a path loss value of each beam belonging to the second beam group, and determining transmission of the second power headroom information when the change in the path loss value is greater than or equal to a predetermined threshold value.

The determining may include determining an average value of path loss values of the beams contained in the first power headroom information, checking a change in the average value, and determining transmission of the second power headroom information when the change in the average value is greater than or equal to a predetermined threshold value.

The determining may include receiving configuration information including index information of a beam for beam measurement from a base station, measuring a beam, based on the configuration information, and determining transmission of the second power headroom information when the index information of the measured beam is different from the index information of the beam contained in the configuration information.

The determining may include receiving a message for a beam change from a base station, and determining transmission of the second power headroom information when an elapsed time after receiving the message exceeds a predetermined reference value.

The transmitting may include transmitting the second power headroom information to the base station by using a predetermined format, and the predetermined format may include index information of each beam and power headroom information for each beam.

The predetermined format may include indicator information indicating whether to perform a back-off operation to lower transmission power of the terminal.

The disclosure provides a terminal in a wireless communication system supporting beamforming, the terminal including a transceiver, and a controller configured to determine whether to transmit second power headroom information, based on information about beams contained in first power headroom information, and to transmit the second power headroom information to a base station when transmission of the second power headroom information is determined.

The controller may be further configured to determine a first beam group including at least one beam having a signal strength greater than or equal to a first predetermined threshold value among the beams contained in the first power headroom information, to check a change in a path loss value of each beam belonging to the first beam group, and to determine transmission of the second power headroom information when the change in the path loss value is greater than or equal to a predetermined threshold value.

The controller may be further configured to determine a second beam group including at least one beam having a signal strength smaller than or equal to a second predetermined threshold value among the beams contained in the first power headroom information, to check a change in a path loss value of each beam belonging to the second beam group, and to determine transmission of the second power headroom information when the change in the path loss value is greater than or equal to a predetermined threshold value.

The controller may be further configured to determine an average value of path loss values of the beams contained in the first power headroom information, to check a change in the average value, and to determine transmission of the second power headroom information when the change in the average value is greater than or equal to a predetermined threshold value.

The controller may be further configured to control the transceiver to receive configuration information including index information of a beam for beam measurement from a base station, to measure a beam, based on the configuration information, and to determine transmission of the second power headroom information when the index information of the measured beam is different from the index information of the beam contained in the configuration information.

The controller may be further configured to transmit the second power headroom information to the base station by using a predetermined format, and the predetermined format may include index information of each beam and power headroom information for each beam.

The predetermined format may include indicator information indicating whether to perform a back-off operation to lower transmission power of the terminal.

The power headroom transmission method according to embodiments of the disclosure enables the transmission of terminal power headroom information according to a beam variation in a system using beamforming and also enables the transmission of terminal power headroom information according to a waveform variation in a system using different uplink waveforms. Through this, it is possible to maximize the system performance and reduce the power consumption of the terminal.

BRIEF DESCRIPTION OF THE DRAWINGS

FIG. 5B shows an example of a MAC CE format of LTE for power headroom information transmission (when carrier aggregation is applied).

FIG. 6B shows another example of a MAC CE format for power headroom information transmission in consideration of beamforming.

DETAILED DESCRIPTION

Figure 1:
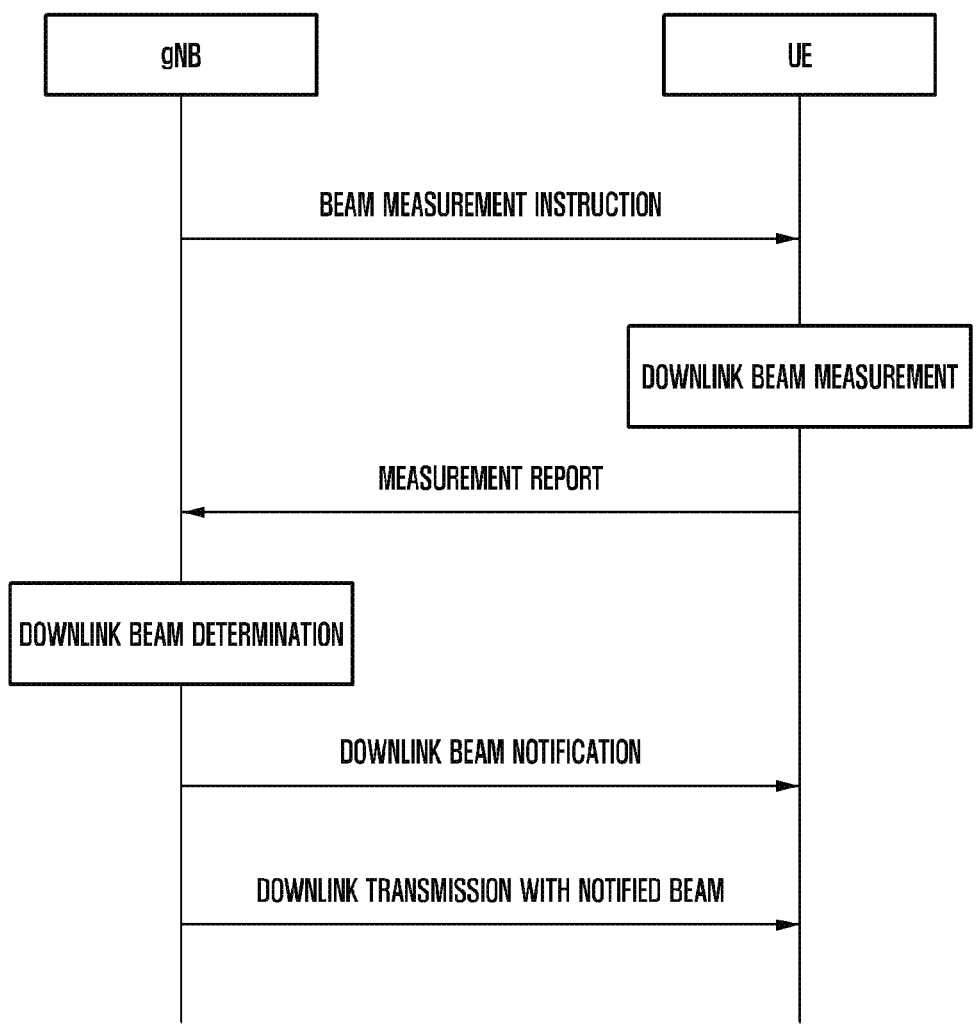
FIG. 1 shows an example of downlink beam management.

Now, embodiments of the disclosure will be described in detail with reference to the accompanying drawings. In the following description of this disclosure, detailed description of known functions and configurations will be omitted when it may make the subject matter of the disclosure rather unclear. The terms used herein are defined in consideration of functions in the disclosure, and may be changed according to the intention of the user, the operator, or the like. Therefore, the definition should be based on the contents throughout this specification.

The advantages and features of the disclosure and the manner of achieving them will become apparent with reference to embodiments described in detail below and with reference to the accompanying drawings. The disclosure may, however, be embodied in many different forms and should not be construed as being limited to the embodiments set forth herein. Rather, these embodiments are provided so that the disclosure will be thorough and complete and will fully convey the scope of the disclosure to those skilled in the art. To fully disclose the scope of the disclosure to those skilled in the art, the disclosure is only defined by the scope of claims. In the disclosure, similar reference numbers are used to indicate similar constituent elements.

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system.

In order to accomplish a higher data transfer rate, the implementation of the 5G communication system in a super-high frequency (mmWave) band (e.g., about a 60 GHz band) is being considered. Also, in order to obviate a propagation loss of a radio wave and increase a delivery distance of a radio wave in the super-high frequency band, discussions for the 5G communication system are underway about various techniques such as a beamforming, a massive MIMO, a full dimensional MIMO (FD-MIMO), an array antenna, an analog beam-forming, and a large scale antenna.

Additionally, for an improvement in network of the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like.

Also, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

Meanwhile, in the conventional LTE, a terminal transmits power headroom information to a base station through uplink. A power headroom value means a difference between the maximum transmission power of the terminal and the transmission power actually used for uplink transmission by the terminal. The base station may use the power headroom information received from the terminal in a method for optimizing system performance. For example, when the power headroom information received from the terminal is a positive value, the base station determines that the terminal is capable of increasing the uplink transmission power, and thus may increase the amount of resources allocated to the terminal at the time of scheduling for the terminal. On the contrary, when the power headroom information received from the terminal is a negative value, the base station determines that the terminal should reduce the uplink transmission power, and thus may decrease the amount of resources allocated to the terminal at the time of scheduling for the terminal. Through this operation, it is possible to secure the coverage of data (or control information) transmitted in the uplink and also reduce power consumption of the terminal.

This operation regarding transmission and reception of power headroom information between a base station and a terminal is also required in the 5G communication system using beamforming, so that a design for a method and device for transmitting power headroom information in a beamforming system is necessary.

Meanwhile, in the conventional LTE system, a discrete Fourier transform-spread-orthogonal frequency division multiplexing (DFT-S-OFDM) has been used as an uplink waveform. Contrary to this, in the 5G communication system, both DFT-S-OFDM and cyclic prefix-orthogonal frequency division multiplexing (CP-OFDM) may be used as uplink waveforms in order to maximize the flexibility of system operation. Because different waveforms have different characteristics, it is necessary to design a method and device for transmitting power headroom information in consideration of this point.

The power headroom refers to a difference between the current transmission power of the terminal and the maximum output power of the terminal. The terminal may calculate the power headroom as shown in Equation 1 below.

$$PH(i) = P_{CMAX}(i) - P_{TX}(i) \qquad \text{Equation 1}$$

In Equation 1, PH(i) denotes the power headroom value calculated by the terminal in the $i^{th}$ subframe of the terminal, and the PH(i) may be a difference between $P_{CMAX}(i)$, which is the maximum output power of the terminal, and $P_{TX}(i)$ which is transmission power actually used by the terminal to transmit uplink data and control information in the $i^{th}$ subframe. The $P_{TX}(i)$ may vary depending on whether data information was transmitted, control information was transmitted, or both were simultaneously transmitted in the $i^{th}$ subframe. Equation 2a below shows an example of $P_{TX}(i)$ in case of transmitting data information in the $i^{th}$ subframe, and Equation 2b below shows an example of $P_{TX}(i)$ in case of transmitting control information in the $i^{th}$ subframe.

$$P_{TX}(i)=10 \log_{10}(M_{PUSCH}(i))+P_{0\_PUSCH}(j)+\alpha(j)\cdot PL+\Delta_{TF}(i)+f(i)[dBm] \quad \text{Equation 2a}$$

In Equation 2a, $P_{TX}(i)$ denotes the transmission power of a physical uplink shared channel (PUSCH) which is a physical channel for uplink data transmission in the $i^{th}$ subframe of the terminal. In addition, $P_{0\_PUSCH}$ is a parameter composed of $P_{O\_NOMINAL\_PUSCH}+P_{O\_UE\_PUSCH}$, and is a value notified to the terminal by the base station through higher layer signaling (RRC signaling). In particular, $P_{O\_NOMINAL\_PUSCH}$ is a cell-specific value composed of 8-bit information and has a range of [−126, 24] dB. Also, $P_{O\_UE\_PUSCH}$ is a UE-specific value composed of 4-bit information and has a range of [−8, 7] dB. The cell-specific value is transmitted to the terminal by the base station through cell-specific RRC signaling (system information block (SIB)), and the UE-specific value is transmitted to the terminal by the base station through dedicated RRC signaling. In this case, j denotes a PUSCH grant scheme. Specifically, j=0 indicates a semi-persistent grant, j=1 indicates a dynamic scheduled grant, and j=2 indicates a PUSCH grant for a random access response. Meanwhile, $\alpha(j)$ is a value for compensating for path loss. In case of $\alpha(0)$ and $\alpha(1)$, the base station notifies one value of {0, 0.4, 0.5, 0.6, 0.7, 0.8, 0.9, 1} to all terminals in a cell cell-specifically through 3-bit information. The value of $\alpha(2)=1$ is used.

PL is a path loss value calculated by the terminal, and is calculated through the reception power of a cell-specific reference signal (CRS) of a downlink channel transmitted by the base station. $\Delta_{TF}(i)$ is a value related to MCS, and f(i) is a parameter for performing power control with a closed loop.

$$P_{TX}(i)=P_{0\_PUCCH}+PL+h(n_{CQI},n_{HARQ},n_{SR})+\Delta_{F\_PUCCH}(F)+\Delta_{TxD}(F')+g(i)[dBm] \quad \text{Equation 2b}$$

In Equation 2b, $P_{TX}(i)$ denotes the transmission power of a physical uplink control channel (PUCCH) which is a physical channel for uplink control information transmission in the $i^{th}$ subframe of the terminal. In addition, $P_{0\_PUCCH}$ is a parameter composed of $P_{O\_NOMINAL\_PUCCH}+P_{O\_UE\_PUCCH}$, and is a value notified to the terminal by the base station through higher layer signaling (RRC signaling). In particular, $P_{O\_NOMINAL\_PUCCH}$ is a cell-specific value composed of 8-bit information and has a range of [−126, 24] dB. Also, $P_{O\_UE\_PUCCH}$ is a UE-specific value composed of 4-bit information and has a range of [−8, 7] dB. The cell-specific value is transmitted to the terminal by the base station through cell-specific RRC signaling (system information block (SIB)), and the UE-specific value is transmitted to the terminal by the base station through dedicated RRC signaling. Meanwhile, unlike the transmission power control of the PUSCH, the PUCCH transmission power control does not use $\alpha(j)$ for compensating for path loss.

PL, which is a path loss value calculated by the terminal, is calculated through the reception power of a cell-specific reference signal (CRS) of a downlink channel transmitted by the base station as in the transmission power control of the PUSCH. $\Delta_{F\_PUCCH}(F)$ is transmitted to the terminal through higher layer signaling (cell-specific or UE-specific RRC signaling), and is a value that varies according to the format of the PUCCH. $\Delta_{TxD}(F')$ is transmitted to the terminal through higher layer signaling (cell-specific or UE-specific RRC signaling) when the PUCCH is transmitted via 2-antenna ports (i.e., space frequency block code (SFBC)), and is a value that varies according to the format of the PUCCH. For $h(n_{CQI},n_{HARQ},n_{SR})$, different values are used according to the PUCCH format, wherein $n_{CQI}$ is the number of bits used for feedback of channel quality information, $n_{HARQ}$ is the number of bits used for HARQ-ACK/NACK feedback, and $n_{SR}$ is 0 or 1 as a bit used for feedback of scheduling request. Also, g(i) is a parameter for performing power control in a closed loop, and the base station may perform UE-specific correction of PUCCH transmission power.

Meanwhile, $P_{CMAX}(i)$ representing the maximum output power of the terminal in the $i^{th}$ subframe is a value having a range of the following Equation 3a, and may be calculated by the terminal through the following Equations 3b and 3c.

$$P_{CMAX\_L} \leq P_{CMAX} \leq P_{CMAX\_H} \quad \text{Equation 3a}$$

In Equation 3a, $P_{CMAX\_L}$ denotes a low value of $P_{CMAX}$, and may be calculated by the terminal through Equation 3b below. Also, $P_{CMAX\_H}$ denotes a high value of $P_{CMAX}$, and may be calculated by the terminal through Equation 3c below.

$$P_{CMAX\_L}=\min\{P_{EMAX}-\Delta T_C, P_{PowerClass}-\max\{MPR+AMPR+\Delta T_{IB}+\Delta T_C, PMPR\}\} \quad \text{Equation 3b}$$

$$P_{CMAX\_H}=\min\{P_{EMAX}, P_{PowerClass}\} \quad \text{Equation 3c}$$

In Equations 3b and 3c, $P_{EMAX}$ is the maximum transmission power that the terminal can use for uplink transmission in a specific cell, and is a value that the base station notifies through UE-specific RRC signaling. $P_{PowerClass}$ is a value corresponding to a power class of the terminal, and may correspond to the capability of the terminal (e.g., 23 dBm). Maximum power reduction (MPR) may reflect the amount of frequency resources (the number of RBs: the number of resource blocks) and the modulation allocated to the terminal for uplink data and control channel transmission. Additional maximum power reduction (AMPR) is a value based on an adjacent channel leakage ratio (ACLR) and spectral emission requirements. $\Delta T_{IB}$ is a tolerance value according to a band combination for communication, $\Delta T_C$ is a value that varies depending on an aggregated channel bandwidth and a guard-band, and power amplifier-maximum power reduction (PMPR) is a parameter for compliance with regulations in a multi-RAT environment.

The terminal reports a power headroom value calculated through Equation 1 to the base station, and the base station may use the power headroom value in optimizing the system operation. For example, when a power headroom value reported to the base station by a certain terminal is a positive value, the base station may allocate more resources (resource blocks (RBs)) to the terminal to increase the system yield. In contrast, when a power headroom value reported to the base station by a certain terminal is a negative value, the base station may allocate less resources to the terminal or reduce the transmission power of the terminal through a transmission power control command. Through this, it is possible to reduce unnecessary power consumption of the terminal or prevent performance degradation of a base station reception signal due to in-band emission.

Meanwhile, in a system that uses beamforming, the degree of inconsistency between a downlink channel state and an uplink channel state may increase much in comparison with a system that does not use beamforming. For the first reason, a transmission beam gain for downlink transmission of the base station and a reception beam gain for uplink reception of the base station may be different from each other. Similarly, a reception beam gain for downlink reception of the terminal and a transmission beam gain for uplink transmission of the terminal may be different from each other. The reason is that the number of panels of a base station transmitting antenna and the number of panels of a base station receiving antenna may be different, and similarly the number of panels of a terminal transmitting antenna and the number of panels of a terminal receiving antenna may be different. For example, the base station may use transmission power of 46 dBm for downlink transmission, whereas the terminal may use relatively less transmission power of 23 dBm. Therefore, the coverage of a downlink signal and the coverage of an uplink signal may be different. To solve this problem, by increasing the number of receiving antenna panels of the base station (compared to the number of transmitting antenna panels of the base station), it is possible to increase the reception beam gain of the base station and thus secure the coverage of the uplink signal. In addition, by increasing the number of transmitting antenna panels of the terminal (compared to the number of receiving antenna panels of the terminal), it is possible to increase the transmission beam gain of the terminal and thus secure the uplink coverage.

The second reason that the degree of inconsistency between the downlink channel state and the uplink channel state may increase in the system using beamforming is that different beam gains may exist according to a pair of beams used by the base station and the terminal. For example, let's assume that the base station uses N beams (1, 2, ..., N) and the terminal uses M beams (1, 2, ..., M). Also, let's assume that the terminal regards the reception beam 1 thereof and the transmission beam 3 of the base station as the best downlink beam-pair. The best beam may mean a beam having the greatest received signal strength. However, in this case, the base station may regard the transmission beam 2 of the terminal and the reception beam N thereof as the best uplink beam-pair. As mentioned above, because beam gains used to form the best downlink beam-pair and the best uplink beam-pair may be different from each other, the inconsistency between the downlink channel state and the uplink channel state may occur. As another example, even though the beam gains of the best downlink beam-pair and the best uplink beam-pair are the same, the base station may instruct, for a flexible beam operation, a specific terminal to transmit uplink data and control information through the second best uplink beam-pair or the third best uplink best beam-pair instead of the best uplink beam-pair. In this case, the inconsistency between the downlink channel state and the uplink channel state may increase.

The third reason that the degree of inconsistency between the downlink channel state and the uplink channel state may increase in the system using beamforming is that different beam widths may be used in transmission of a synchronization signal, a control channel, and a data channel. Specifically, in the beamforming system, the synchronization signal, the control channel, and the data channel may be transmitted by performing beam sweeping. If the synchronization signal and the control channel (e.g., physical broadcast channel (PBCH)) requiring a broadcast or multicast are transmitted using a narrow beam width, the time spent on beam sweeping may be increased because of having to cover the entire cell through a beam having a narrow beam width. Therefore, it is needed to use a beam having a wider beam width in transmitting the synchronization signal and the control channel requiring broadcast or multicast transmission. In contrast, the control channel (e.g., a physical uplink control channel (PUCCH)) and the data channel (e.g., a physical uplink shared channel (PUSCH)) requiring unicast transmission need to be transmitted using a beam having a narrower beam width, for securing coverage and reducing interference, because they are transmitted to a specific terminal. When performing downlink channel measurement with a wider beam and performing uplink transmission with a narrower beam, the degree of inconsistency between the downlink channel state and the uplink channel state may increase.

For the above-mentioned various reasons, when the degree of inconsistency between the downlink channel state and the uplink channel state increases in the beamforming system, this may cause serious problems for the base station to operate the system by using power headroom information measured by the terminal through the downlink channel as shown in Equation 1. For example, when the power headroom value of a specific terminal is a positive value, the base station may increase the resources of the terminal (i.e., increase $M_{PUSCH}$ in Equation 2a). This may be equivalent to increasing the transmission power of the terminal. In this case, an actual uplink channel state may be inconsistent with the downlink channel state applied when the terminal calculates the power headroom. This may give rise to a result of using transmission power lower than transmission power the terminal can actually use. Therefore, a problem that coverage of an uplink signal is not secured may arise. As another example, when an actual uplink channel state is inconsistent with the downlink channel state applied when the terminal calculates the power headroom, this may give rise to a result of using transmission power higher than transmission power the terminal can actually use. Thus, unnecessary power consumption of the terminal may be caused. In addition, a case in which the terminal perform transmission at power higher than its maximum transmission output power (power greater than $P_{CMAX}$ in Equation 1) may occur. In this case, the error vector magnitude (EVM) performance of signals transmitted by the terminal through the uplink is degraded, so that the received signal reliability of uplink signals cannot be guaranteed. In addition, when using transmission power higher than transmission power the terminal should actually use, the terminal may be located close to the base station. In this case, the transmission power of the terminal exceeds a dynamic range of a receiver of the base station, thus causing interference to uplink signals of other terminals the base station should receive (in-band emission). Therefore, it may act as a major cause of degradation of system performance.

As described above, in the beamforming system, a problem of inconsistency between the downlink channel and the uplink channel may increase due to a difference in beam gains used in the downlink and the uplink, so that the reliability of power headroom information transmitted to the base station by the terminal may be lowered. Therefore, there is a need for a solution to this problem.

One method for solving the above-described first reason for increasing the inconsistency between the downlink channel and the uplink channel is that the base station measures (or predicts) its transmission beam gain and reception beam gain in a capability negotiation process with the terminal and then notifies this information to the terminal. The terminal may also measure (or predict) its transmission beam gain and reception beam gain and then notify this information to the base station. The terminal may apply such information to the power headroom calculation of Equation 1 above. Specifically, when predicting the path loss (PL) of Equations 2a and 2b, the terminal may compare the transmission beam information of the base station and the reception beam information of the base station, which are received from the base station, and then predict the path loss by using a greater or smaller one of two values or using an average of two values. As another example, the base station may predict the uplink channel state by utilizing information about the transmission beam gain and reception beam gain of the terminal reported from the terminal. At this time, the terminal calculates and reports a power headroom value to the base station without knowing the transmission beam gain and reception beam gain of the base station. In the capability negotiation process, the base station may reinterpret the power headroom information received from the terminal by utilizing information about the transmission beam gain and reception beam gain of the terminal reported from the terminal and information about the transmission beam gain and reception beam gain of the base station. That is, by combining the transmission beam/reception beam gains of the base station/terminal with the power headroom value transmitted by a specific terminal, the base station can determine more accurately whether to increase the resources of the terminal (increase the transmission power) or decrease the resources of the terminal (decrease the transmission power).

In the beamforming system, the beam management for transmission/reception beams of the base station and transmission/reception beams of the terminal is essential for efficient beam operation. Therefore, as in the second and third reasons for increasing the inconsistency between the downlink channel and the uplink channel, the transmission/reception beam gains of the base station and the terminal may be dynamically changed according to the beam width and the beam-pair operated by the base station and the terminal. In such a situation, a method of exchanging beam gain information through capability negotiation between the base station and the terminal may have limitations on increasing the accuracy of power headroom information. Therefore, in the beamforming system, the transmission of the power headroom information in consideration of the beam management is required.

Specifically, FIG. 1 shows an example of downlink beam management. The base station (i.e., gNB) may instruct the terminal (i.e., UE) to measure a downlink beam. This downlink beam measurement instruction of the base station may be made periodically or aperiodically. In case of periodically instructing the beam measurement, the base station may periodically allocate a reference signal (RS) for the terminal to measure the downlink beam, and also periodically allocate a resource for the terminal to report a measurement result of the downlink beam to the base station. In this case, the beam measurement result reported to the base station by the terminal may include at least one beam ID (or a beam index or an index of a resource in which a beam is transmitted) and the beam received signal strength for the corresponding beam ID. For such periodic beam measurement and beam measurement result report of the terminal, the base station may operate a beam measurement timer (BMT). The terminal may report the expiration of the BMT to the base station when its BMT expires, and then the base station may release all downlink and uplink resources (e.g., the downlink resource allocated for the RS for the beam measurement and the uplink resource used for the beam measurement report) used for the beam measurement and beam measurement result report by the terminal.

On the other hand, the base station may aperiodically instruct the terminal to measure the downlink beam. In this case, the base station may use a downlink control information (DCI) or a specific field in the DCI for uplink transmission to trigger the beam measurement instruction. That is, specific X bits in the DCI may indicate that the RS for beam measurement will be transmitted after the current subframe (a subframe in which the DCI is transmitted) or after K subframes from the current subframe. In addition, the base station may use a specific field of the DCI in allocating an uplink resource for the terminal to report the beam measurement information. The allocation information of the beam measurement RS informing the transmission of the beam measurement RS on the downlink and the information about the uplink resource allocation for the report of the beam measurement result may be transmitted through the same DCI or different DCIs. In the latter case, different DCIs may refer to DCI 1 (the downlink resource allocation for the transmission of the beam measurement RS) and DCI 2 (the uplink resource allocation for the report of the beam measurement result) both of which are transmitted on a physical downlink control channel (PDCCH) of the same subframe, or refer to DCI 1 (transmitted in subframe n) and DCI 2 (transmitted in subframe n+k) respectively transmitted on PDCCHs of different subframes.

The downlink beam measurement instruction information transmitted from the base station to the terminal may include information on how many downlink beams should be measured by the terminal. This information may be transmitted to the terminal through UE-specific RRC, MAC CE, group common DCI, or UE-specific DCI. When the base station instructs the measurement for N beams, the terminal measures N downlink beams and reports a beam measurement result of the beams. The beam measurement result report transmitted from the terminal to the base station may include the ID of a beam (or the index of a resource in which the beam is transmitted) and the received signal strength of the beam.

The base station that receives the beam measurement result report from the terminal in the $n^{th}$ subframe may determine a downlink beam of the terminal and notify it to the terminal. At this time, the base station may notify, to the terminal through a MAC control element (CE), UE-specific DCI, or group common DCI, information on at least one beam ID (or an index of a resource in which a beam is transmitted) to be used by the terminal. Using an explicit or implicit method, the base station may transmit the information on the beam ID (BID) to the terminal. For example, assume that the terminal transmits the beam measurement result report for three beams to the base station, and the report contains in order a BID-3 (beam ID 3) and the received signal strength thereof, a BID-7 and the received signal strength thereof, and a BID-21 and the received signal strength thereof. Also, assume that the base station determines the downlink beam of the terminal to the BID-21. Then, the base station may explicitly notify the BID-21 to the terminal or implicitly notify the third beam based on the beam order reported by the terminal. Although it is described that the base station notifies information about one downlink beam to the terminal, the base station may inform that the terminal will receive downlink data or control information through two or more beams.

Meanwhile, the base station may determine whether to change the downlink beam by comparing the beam measurement result report previously received in the $(n-k)^{th}$ subframe and the beam measurement result report received in the $n^{th}$ subframe from the same terminal. When there is a need for a change of the downlink beam, the base station may notify, through a MAC control element (CE), UE-specific DCI, or group common DCI, the terminal that the downlink beam will be changed. In this case, as described above, the ID of a beam to be changed (or the index of a resource in which the changed beam is transmitted) may be included. Then, the base station may transmit downlink data and control information to the terminal through the changed beam. In this case, a rule promised in advance between the base station and the terminal is required. For example, after notifying the terminal that the downlink beam will be changed, the base station may use the changed beam in the just next transmission of downlink data and control information. As another example, the base station and the terminal may apply the changed beam, based on a timer. That is, the base station drives a timer after notifying the terminal that the downlink beam will be changed, and the terminal drives a timer after receiving such a notification from the base station. Before the timer expires, the terminal may switch to the changed beam and prepare for downlink reception. This timer-based operation uses a large subcarrier spacing, so that it is possible to solve a problem that the base station and the terminal should quickly change a beam in the mmWave system having a short length of symbol and a short length of subframe (or slot).

Figure 2:
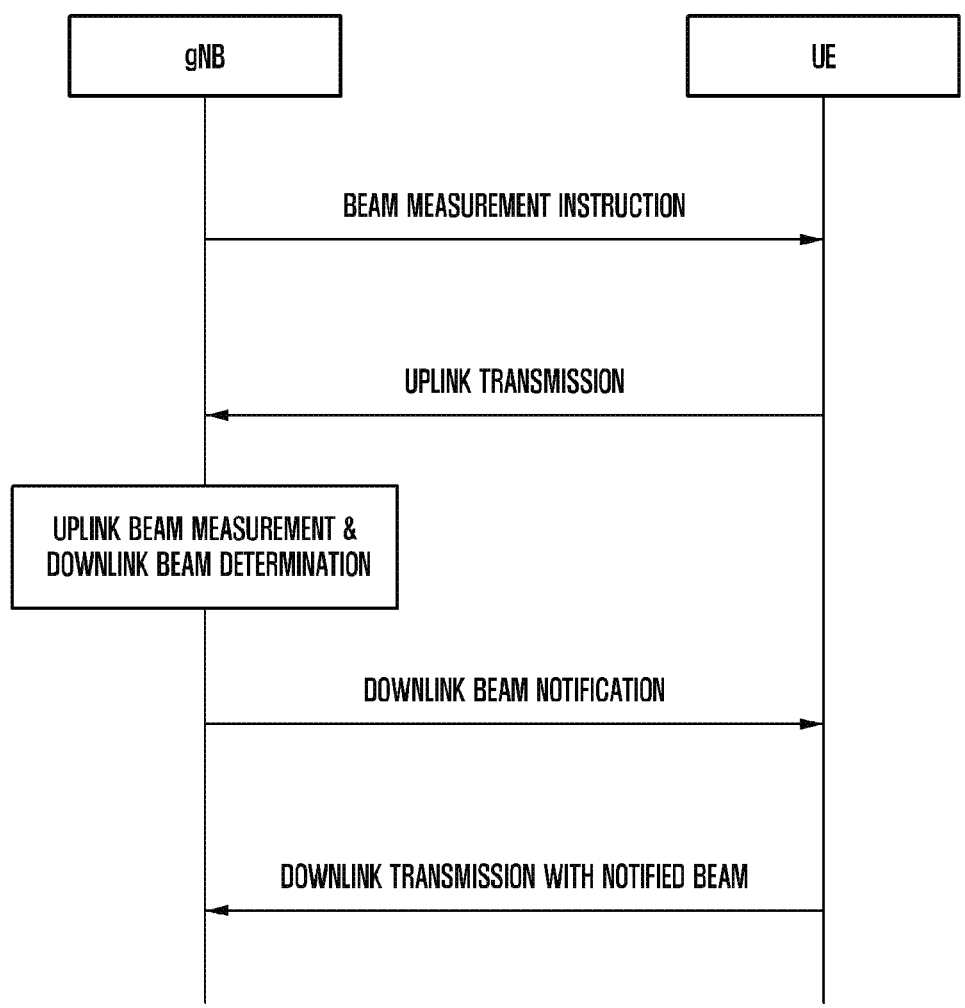
FIG. 2 shows an example of downlink beam management (when there is a beam correspondence between a downlink beam and an uplink beam).

FIG. 2 shows another example of downlink beam management, and especially shows, contrary to FIG. 1, a beam management procedure in a situation where beam correspondence or beam reciprocity exists between the downlink beam and the uplink beam. In this case, the beam correspondence at the base station may be maintained when the directions of the transmission beam and the reception beam of the base station coincide with each other, and also the beam correspondence at the terminal may be maintained when the directions of the transmission beam and the reception beam of the terminal coincide with each other. Specifically, assume that the base station and the terminal can form N beams and M beams, respectively. The fact that beam correspondence is maintained at the base station means that a transmission beam 1 of the base station and a reception beam 1 of the base station have the same characteristics (e.g., the same direction). In addition, the fact that beam correspondence is maintained at the terminal means that a reception beam 2 of the terminal and a transmission beam 2 of the terminal have the same characteristics. That is, if the transmission beam 1 of the base station and the reception beam 2 of the terminal form a downlink beam-pair in a beam compatible environment, an uplink beam-pair formed by the transmission beam 2 of the terminal and the reception beam 1 of the base station may maintain the same beam characteristics (e.g., beam direction, beam gain, beam width, etc.) as those of the downlink beam-pair.

In FIG. 2, because the beam correspondence is maintained between the downlink beam-pair and the uplink beam-pair, the base station may measure the uplink beam of the terminal and apply it to downlink beam management. The downlink beam management instruction of the base station may be made periodically or aperiodically. In case of periodically instructing the beam management, the base station may provide information on transmission of a reference signal (RS) for uplink beam measurement to the terminal in order to measure the uplink beam transmitted by the terminal. For example, the base station may notify, to the terminal, time resources (e.g., a slot or subframe index, a symbol index in the slot or subframe, etc.) and frequency resources (e.g., bandwidth for SRS transmission) for the transmission of a sounding reference signal (SRS) for the uplink beam measurement of the terminal. In case of periodically instructing the beam management, the base station may notify the time-frequency resources for the SRS transmission to the terminal through RRC. Upon receiving this, the terminal forms different uplink beams corresponding to the number of beams instructed by the base station and transmits the uplink SRS.

On the other hand, the base station may aperiodically instruct the downlink beam management to the terminal. In this case, the base station may use a downlink control information (DCI) or a specific field in the DCI for uplink transmission to trigger the beam management instruction. That is, specific X bits in the DCI may indicate that the RS (e.g., SRS) for uplink beam measurement should be transmitted after the current subframe (a subframe in which the DCI is transmitted) or after K subframes from the current subframe. At this time, the base station may notify one or both of the number of symbols of the RS used for uplink beam measurement and a symbol position of RS transmission (e.g., the last symbol or last second symbol of the slot or subframe) to the terminal via the DCI. Such information may be related to how many uplink beams should be used for the terminal to perform uplink transmission. For example, the downlink beam management information transmitted to the terminal by the base station may include information on how many beams the terminal should form and transmit. For example, assume that the base station has to measure four uplink beams and therefore instructed to transmit four different uplink beams. In this case, the terminal may transmit four RSs for uplink beam measurement via different CP-OFDM or DFT-S-OFDM symbols (that is, transmit four uplink beam measurement RSs). As another example, if different beams can be transmitted through frequency division multiplexing (FDM) in the same CP-OFDM (or DFT-S-OFDM) symbol, the uplink beam measurement RS(s) may be transmitted using fewer than four CP-OFDM (or DFT-S-OFDM) symbols.

The base station may transmit, to the terminal through UE-specific RRC, MAC CE, group common DCI, or UE-specific DCI, information on how many uplink beams should be transmitted. For example, when the base station instructs transmission of N uplink beams, the terminal transmits N uplink beams. The base station that receives the N uplink beams from the terminal may determine a downlink beam (because there is the beam correspondence between the uplink beam-pair and the downlink beam-pair).

The base station may notify information on the downlink beam to the terminal through a MAC control element (CE), UE-specific DCI, or group common DCI. In this case, information about at least one beam ID (or an index of a resource in which a beam is transmitted) may be included. Then, the base station may transmit downlink data and control information to the terminal through the notified beam. In this case, a rule promised in advance between the base station and the terminal is required. For example, after notifying the downlink beam to the terminal, the base station may use the notified beam in the just next transmission of downlink data and control information. As another example, the base station and the terminal may apply the notified beam, based on a timer. That is, the base station drives a timer after notifying the downlink beam to the terminal, and the terminal drives a timer after receiving such a notification from the base station. Before the timer expires, the terminal may prepare for downlink reception by forming a beam in a beam direction notified by the base station or switching a beam to the notified beam direction. This timer-based operation uses a large subcarrier spacing, so that it is possible to solve a problem that the base station and the terminal should quickly form or change a beam in the mmWave system having a short length of symbol and a short length of subframe (or slot).

Figure 3:
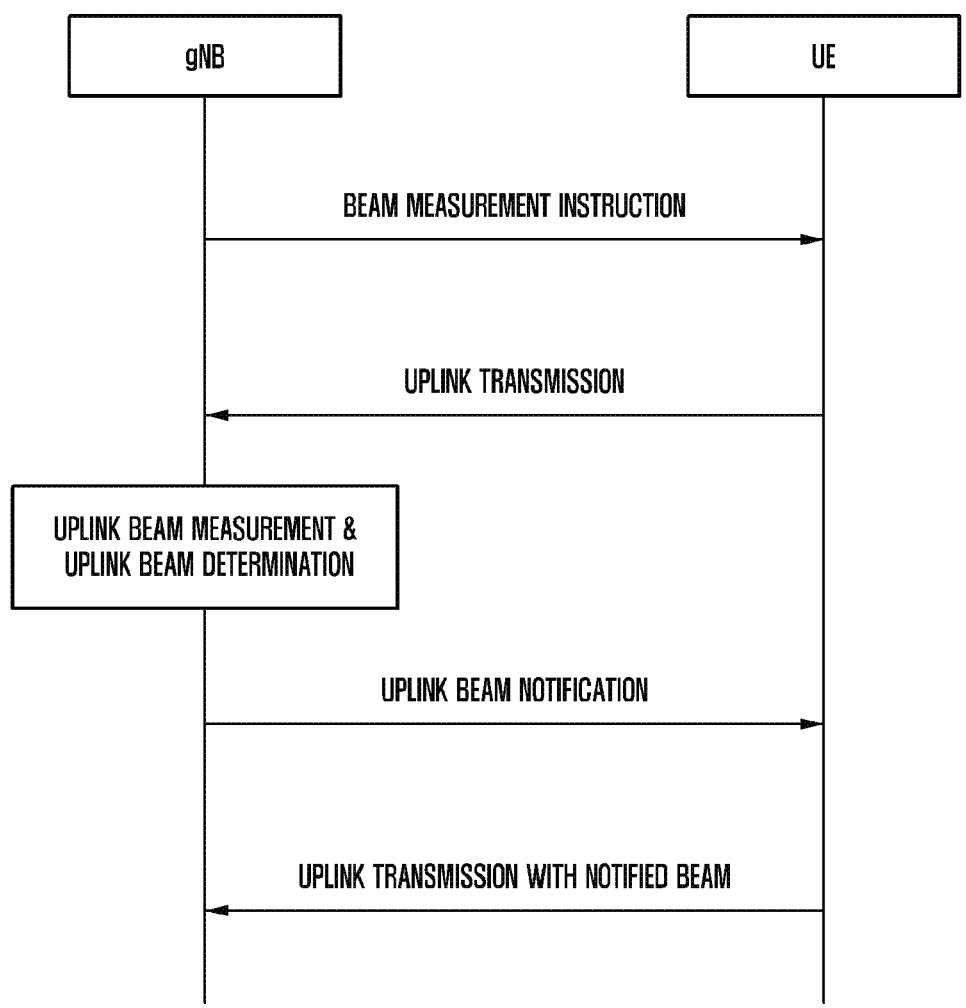
FIG. 3 shows an example of uplink beam management.

FIG. 3 shows an example of uplink beam management. Until the operation of determining a beam at the base station may be the same as in FIG. 2. After determining an uplink beam, the base station may notify information about the uplink beam to the terminal through a MAC control element (CE), UE-specific DCI, or group common DCI. In this case, information on which beam should be used for uplink transmission may be included (that is, information on a beam ID (or an index of a resource in which a beam is transmitted) may be included). When one beam ID is included, the terminal performs uplink transmission via the corresponding beam. When two or more beam IDs are included, the terminal performs uplink transmission via the corresponding beams. For this operation, a rule promised in advance between the base station and the terminal is required. For example, after receiving information on the uplink beam from the base station, the terminal may use the corresponding beam(s) in the just next transmission of uplink data and control information. As another example, the base station and the terminal may apply the beam(s), based on a timer. That is, the base station drives a timer after transmitting the uplink beam information to the terminal, and the terminal drives a timer after receiving the uplink beam information from the base station. Before the timer expires, the terminal may prepare for uplink transmission by switching to a direction of the beam(s) instructed by the base station. This timer-based operation uses a large subcarrier spacing, so that it is possible to solve a problem that the base station and the terminal should quickly form or change a beam in the mmWave system having a short length of symbol and a short length of subframe (or slot).

Figure 4:
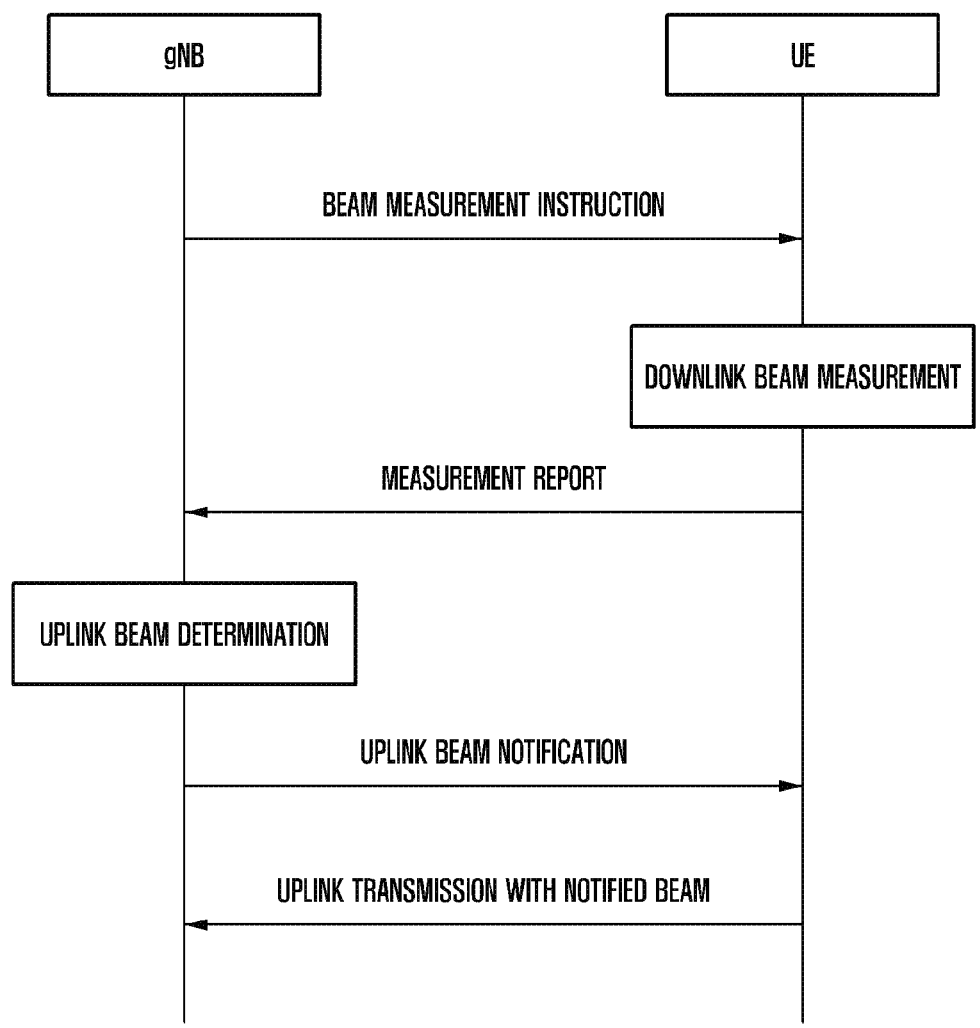
FIG. 4 shows an example of uplink beam management (when there is a beam correspondence between a downlink beam and an uplink beam).

FIG. 4 shows another example of uplink beam management, and shows a beam management procedure in a situation where beam correspondence exists between the downlink beam and the uplink beam. Until the operation of determining a beam at the base station may be the same as in FIG. 1. After determining the beam, the base station transmits information on the uplink beam to the terminal, and then the terminal may perform uplink transmission via the corresponding beam(s). In this case, the operations of the base station and the terminal may be the same as described above in FIG. 3.

In the system to which beamforming is applied, the beam management for transmission and reception beams of each of the base station and the terminal is essential. In this case, transmission and reception beam gains of the base station and the terminal may be varied dynamically. Therefore, power headroom information transmission needs to consider beam management of the base station and the terminal. In the disclosure, it is assumed that the base station and the terminal perform the beam management in accordance with the beam management procedure shown in FIG. 1, 2, 3, or 4.

Figure 5A:
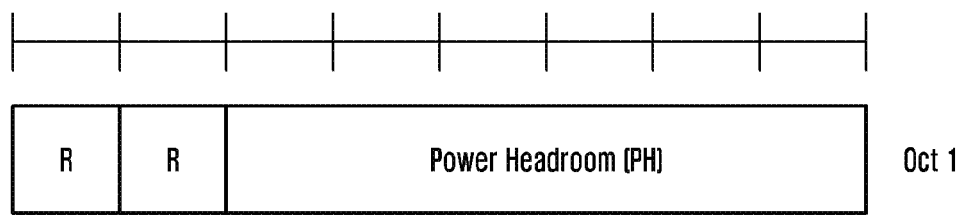
FIG. 5A shows an example of a MAC CE format of LTE for power headroom information transmission (when carrier aggregation is not applied).

In the conventional LTE, the power headroom information of the terminal is transmitted through the MAC CE, and may have a format as shown in FIG. 5A or 5B. Specifically, FIG. 5A shows a format for transmitting the power headroom information when carrier aggregation (CA) is not used, and FIG. 5B shows a format for transmitting the power headroom information when CA is applied. In FIGS. 5A and 5B, 'R' denotes a reserved bit and is set to '0'. In FIGS. 5A and 5B, the power headroom information may be represented by 6 bits, and may have an interval of 1 dB from −23 dB to 40 dB. Meanwhile, in FIG. 5B, '$C_i$' is a field indicating whether power headroom information of SCell index i (secondary cell i) exists. For example, if power headroom information of SCell having index 7 is not included in the corresponding MAC CE, $C_7$ may be set to '0'. Type 1 power headroom information includes a power headroom value calculated by considering only PUSCH transmission power, and type 2 power headroom information includes a power headroom value calculated by considering a case where both PUSCH and PUCCH are transmitted. $P_{CMAX,c}$ denotes the maximum output transmission power that can be used by the terminal in a component carrier, c, and may be calculated by the terminal through the above Equations 3a, 3b, and 3c.

Figure 6A:
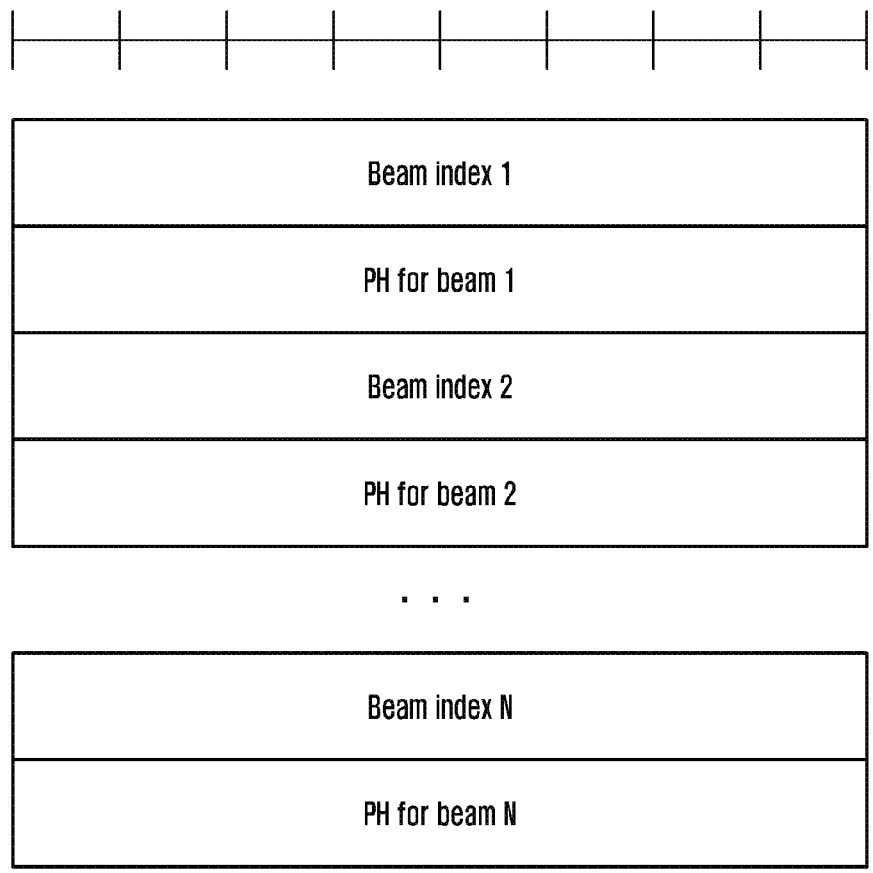
FIG. 6A shows an example of a MAC CE format for power headroom information transmission in consideration of beamforming.
Figure 6C:
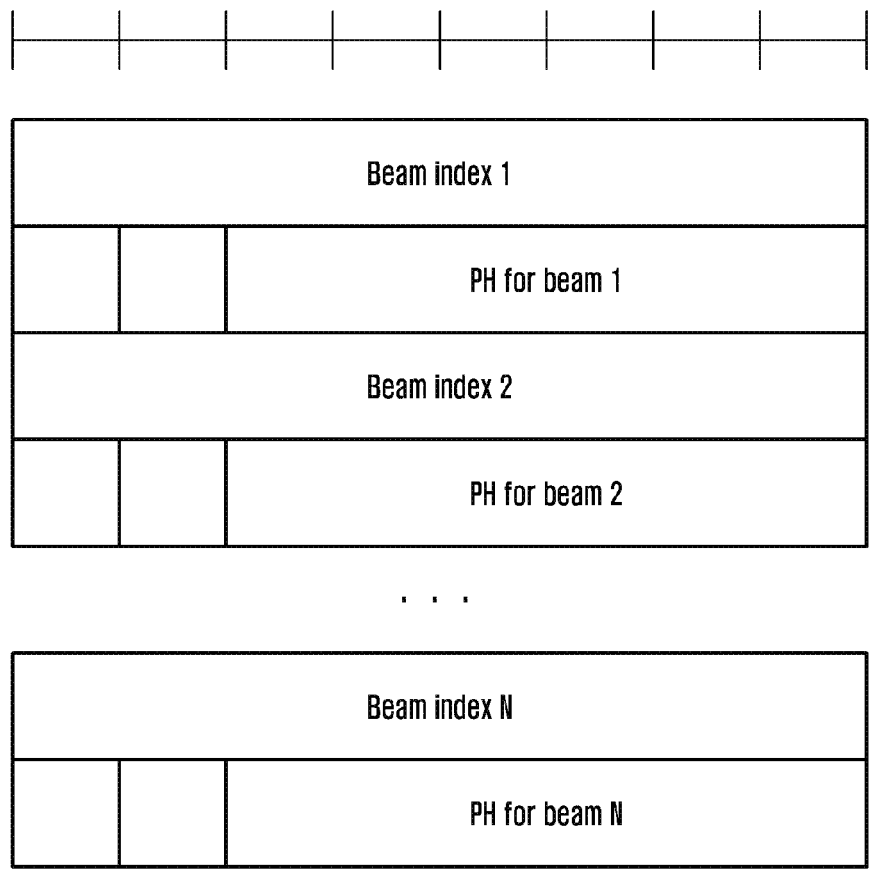
FIG. 6C shows still another example of a MAC CE format for power headroom information transmission in consideration of beamforming.

Meanwhile, the power headroom information considering beamforming may be transmitted using the MAC CE format shown in FIGS. 6A, 6B, and 6C. FIG. 6A shows that each of a beam ID and a power headroom value has a size of 8 bits. In FIG. 6B, the beam ID has a size of 8 bits, and the power headroom value has a size of 6 bits. In FIG. 6C, the beam ID has a size of 10 bits, and the power headroom value has a size of 6 bits. Various modifications may be possible depending on the bit size representing each of the beam ID and the power headroom value. In addition, although not shown in FIG. 6, the MAC CE shown in FIG. 6 may include the maximum output transmission power value ($P_{CMAX}$ or $P_{CMAX,c}$) of the terminal when using the corresponding beam as similarly shown in FIG. 5B.

FIG. 6 (FIGS. 6A, 6B, and 6C) shows examples of transmitting the power headroom information for N beams. In this case, the value of N may be equal to or different from the value of 'N' (the number of downlink beams to be measured by the terminal or the number of uplink beams to be measured by the base station) notified to the terminal for beam management by the base station as illustrated in FIGS. 1, 2, 3 and 4. That is, the number of beams used for beam management may be equal to or different from the number of beams used for power headroom reporting. If the number of beams used for beam management is equal to the number of beams used for power headroom reporting, the terminal may configure the power headroom information to correspond to the number of beams notified by the base station through RRC, MAC CE, group common DCI, or UE-specific DCI for beam management purposes. If the number of beams used for beam management is different from the number of beams used for power headroom reporting, the base station may separately notify, through RRC, MAC CE, group common DCI, or UE-specific DCI, the number of beams that the terminal should use to configure the power headroom information. Although FIG. 6 illustrates a case where a beam ID (beam index) is transmitted, an index of a resource for beam transmission may be included, instead of the beam ID, in the power headroom MAC CE when the beam index (beam ID) is mapped to the resource for beam transmission.

As described above, information about how many beams the power headroom values should be transmitted may be transmitted to the terminal by the base station. Information on which beam the power headroom value should be transmitted may be determined by the terminal itself or notified to the terminal by the base station. As an example where the terminal determines itself, a case in which the terminal measures a downlink beam and transmits beam ID(s) to the base station through the beam measurement result report as illustrated in FIGS. 1 and 4 may be considered. That is, the terminal may transmit a power headroom value for one or more beam IDs included in the downlink beam measurement result report to the base station. In this case, as a variation of FIG. 6, only the power headroom value may be transmitted without the beam ID via the power headroom MAC CE. That is, the terminal may configure the power headroom values in the order of the beam IDs configured in the beam measurement report and then transmit only the power headroom values to the base station through the MAC CE without transmitting the beam IDs. Meanwhile, as an example where the base station notifies the terminal which beam(s) the power headroom value should be transmitted, the base station may determine a beam and notify information on the determined beam(s) to the terminal as illustrated in FIGS. 1 to 4, and then the terminal may configure the power headroom information for that beam(s). In this case, based on the order of the beam(s) configured in the beam information notified by the base station, only the power headroom value may be transmitted to the base station through the MAC CE without transmitting the beam ID.

Figure 7:
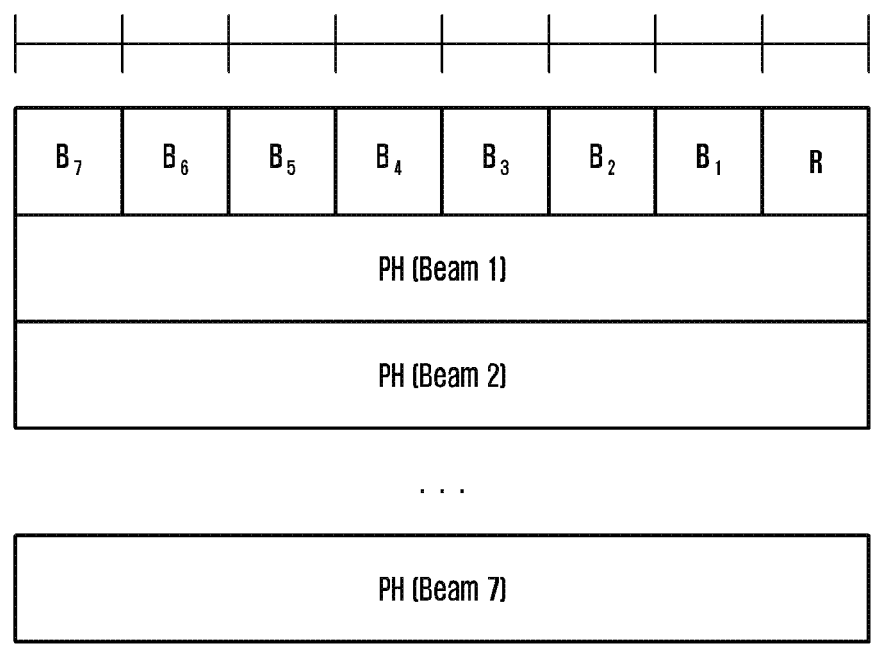
FIG. 7 shows yet another example of a MAC CE format for power headroom information transmission in consideration of beamforming.

FIG. 7 shows another example of a power headroom MAC CE structure considering beamforming. In this case, '$B_i$' may indicate whether there is a beam ID, a beam index, or an index of a resource for transmitting a beam. Specifically, as described in FIG. 6, the beam ID(s) used by the terminal for reporting the beam measurement result may be used for transmitting the power headroom information. In this case, the terminal does not transmit the power headroom information for all beam IDs used for the beam measurement result report, and may instead transmit the power headroom information only for beams with large channel changes (e.g., a beam with a greatly changed direction or a beam with a great change in received signal strength) after a specific time point (a time point promised between the base station and the terminal, e.g., a time point when the beam measurement report has been performed or when the previous power headroom information has been transmitted). Therefore, the terminal may set the value of $B_i$ to '0' (indicating that there is no power headroom value for the corresponding beam ID) or '1' (indicating that there is a power headroom value for that corresponding beam ID) and transmit it to the base station so as to indicate which beam ID the power headroom value is transmitted through the MAC CE of FIG. 7 among the beam IDs used for beam measurement reporting. Similarly, as described in FIG. 6, the beam ID included in the beam information transmitted to the terminal by the base station may be used for transmitting the power headroom information. In this case, the terminal does not transmit the power headroom information for all beam IDs included in the beam information received from the base station, and may instead transmit, as described above, the power headroom information only for beams with large channel changes (e.g., a beam with a greatly changed direction or a beam with a great change in received signal strength) after a specific time point (a time point promised between the base station and the terminal, e.g., a time point when the terminal has performed the beam measurement report for beam management or when the terminal has transmitted the previous power headroom information). In this case, beam IDs configured by the base station and beam IDs transmitted to the base station by the terminal may be different. Therefore, the terminal may set the value of $B_i$ to '0' (indicating that there is no power headroom value for the corresponding beam ID) or '1' (indicating that there is a power headroom value for that corresponding beam ID) and transmit it to the base station so as to indicate which beam ID the power headroom value is transmitted through the MAC CE of FIG. 7. Although not specified in FIG. 7, the MAC CE illustrated in FIG. 7 may include the maximum output transmission power value ($P_{CMAX}$ or $P_{CMAX,c}$) of the terminal when the corresponding beam is used. In addition, although not shown in FIG. 7, reserved bits may be included as shown in FIG. 6B according to the size of a bit indicating the power headroom value. In addition, although FIG. 7 illustrates that power headroom values can be transmitted for up to seven beams (i.e., $B_i$, i={1, 2, ..., 7}), the number of bits occupied by $B_i$ may vary depending on the maximum number of headroom values the terminal can transmit.

In the conventional LTE, conditions that the terminal should transmit a power headroom (i.e., power headroom triggering conditions) may be classified into a timer-based triggering and an event-based triggering. Also, the timer-based triggering may be categorized into a periodic timer-based operation and a prohibit timer-based operation. In the periodic timer-based operation, the terminal may transmit the power headroom at periodic timer intervals configured by the base station. For example, when the base station configures the periodic timer related to the power headroom to 10 ms (10 subframes), the terminal may transmit the power headroom information to the base station after 10 ms from the start of the periodic timer (i.e., at a time point when the periodic timer expires). In the prohibit timer-based operation, the terminal cannot transmit the power headroom while the timer is running. For example, when the prohibit timer related to the power headroom is configured to 10 ms (10 subframes) by the base station, the terminal cannot transmit the power headroom information while the prohibit timer is running. Therefore, the terminal can transmit the power headroom information to the base station after the prohibit timer expires. Meanwhile, the event-based power headroom information transmission is performed when a downlink path loss at a time point when the terminal transmits the last power headroom information to the base station is changed to a specific threshold value (dl-Pathloss-Change) [dB] or more.

Similarly, transmission conditions of power headroom information in consideration of beamforming may be defined. For example, in a periodic timer-based operation, when a periodic timer related to the power headroom is configured to x ms (x subframe) by the base station, the terminal may transmit the power headroom information to the base station after x ms from the start of the periodic timer (i.e., at a time point when the periodic timer expires). In a prohibit timer-based operation, when a prohibit timer related to the power headroom is configured to y ms (y subframe) by the base station, the terminal cannot transmit the power headroom information while the prohibit timer is running, and thus can transmit the power headroom information to the base station after the prohibit timer expires.

Conditions for power headroom information transmission in consideration of event-based beamforming may be variously defined as follows.

1. When the path loss of at least one of beams included in the last power headroom information transmitted to the base station by the terminal is changed to be greater than or equal to a specific threshold value.

2. When the path loss of the best beam (a beam having the greatest signal strength) among beams included in the last power headroom information transmitted to the base station by the terminal is changed to be greater than or equal to a specific threshold value.

3. When the path loss of the worst beam (a beam having the smallest signal strength) among beams included in the last power headroom information transmitted to the base station by the terminal is changed to be greater than or equal to a specific threshold value.

4. When the path loss of X or more beams (in the order of greater signal strength) among beams included in the last power headroom information transmitted to the base station by the terminal is changed to be greater than or equal to a specific threshold value.

5. When the path loss of Y or more beams (in the order of smaller signal strength) among beams included in the last power headroom information transmitted to the base station by the terminal is changed to be greater than or equal to a specific threshold value.

6. When the path loss of all beams included in the last power headroom information transmitted to the base station by the terminal is changed to be greater than or equal to a specific threshold value.

7. When an average value of the path loss of beams included in the last power headroom information transmitted to the base station by the terminal is changed to be greater than or equal to a specific threshold value.

8. When a time of z ms has elapsed since the base station instructed a change of an uplink or downlink beam (z is a timer expiration value and provided to the terminal through RRC configuration by the base station).

9. When the beam ID(s) configured for beam management by the base station and the beam ID(s) measured by the terminal are different from each other.

10. When the downlink beam measurement report of the terminal is performed via an uplink data channel (PUSCH) instead of an uplink control channel (PUCCH)

In addition, under the above conditions, the terminal may request power headroom information transmission and transmit power headroom information as follows.

When the terminal requests transmission of power headroom information, and then when the base station confirms it or allocates an uplink resource, the terminal transmits the power headroom information.

When the terminal requests transmission of power headroom information, and then when the base station instructs to transmit power headroom information about a specific beam or beams (or corresponding reference signal resource location, port information, etc.), the terminal transmits the power headroom information accordingly.

In addition, when the base station directly instructs to transmit power headroom information for a specific beam or beams (or corresponding reference signal resource location, port information, etc.), the terminal may transmit power headroom information accordingly.

Meanwhile, in the conventional LTE system, a discrete Fourier transform-spread-orthogonal frequency division multiplexing (DFT-S-OFDM) has been used as an uplink waveform. Contrary to this, in the 5G communication system, both DFT-S-OFDM and cyclic prefix-orthogonal frequency division multiplexing (CP-OFDM) may be used as uplink waveforms in order to maximize the flexibility of system operation. Because different waveforms have different characteristics, it is necessary to design a method and device for transmitting power headroom information in consideration of this point.

Figure 8:
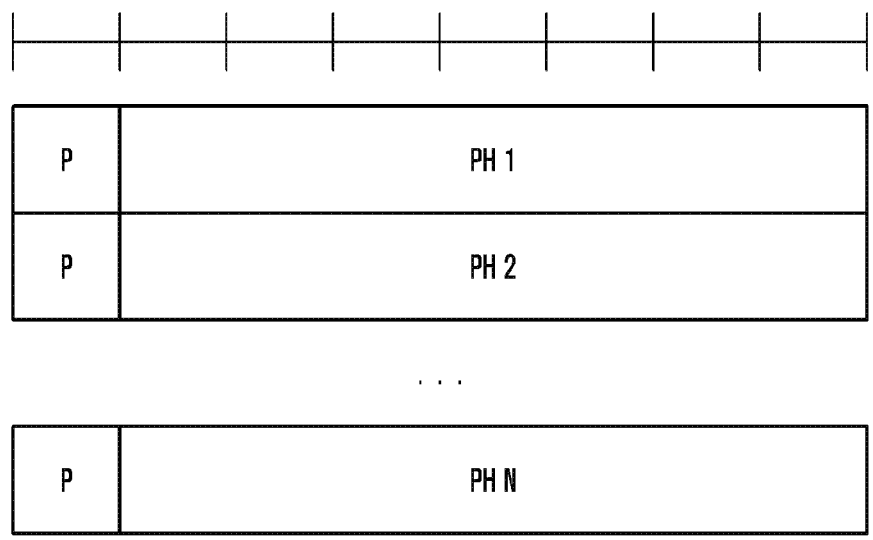
FIG. 8 shows an example of a MAC CE format for power headroom information transmission in consideration of different waveforms.

For example, DFT-S-OFDM has a lower peak-to-average power ratio (PAPR) than CP-OFDM has. Therefore, in order to support a high PAPR of CP-OFDM, a power amplifier (PA) having a wide linear region is needed, which may increase the price of the terminal. Therefore, in order to support different waveforms by using the same PA in the same terminal, it is required to perform the transmission power back-off, and thus to reduce the amount of signals that deviate from the linear region of the PA due to the high PAPR of CP-OFDM. In this case, as shown in FIG. 8, the power headroom information may include the fact that the terminal performs the back-off due to the use of CP-OFDM. Specifically, in FIG. 8, 'P' is a bit indicating whether the terminal has performed the back-off in corresponding power headroom information. If the back-off has been performed, 'P' may be set to '1'. In addition, if the terminal has performed the back-off of transmission power due to the use of CP-OFDM, the $P_{CMAX}$ specified in Equations 3a, 3b, and 3c may be changed to $\tilde{P}_{CMAX}$. Here, $\tilde{P}_{CMAX} = P_{CMAX} - \Delta$, and $\Delta$ is the value of the back-off performed by the terminal.

Figure 9:
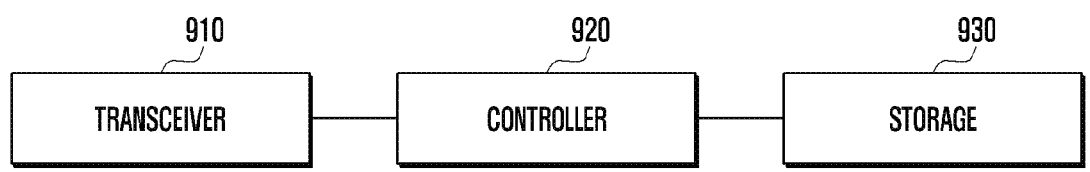
FIG. 9 is a diagram illustrating a terminal according to the disclosure.

FIG. 9 is a diagram illustrating a terminal according to the disclosure.

The terminal according to the disclosure may include a transceiver 910, a controller 920 configured to determine whether to transmit second power headroom information, based on information about beams contained in first power headroom information, and to transmit the second power headroom information to a base station when transmission of the second power headroom information is determined, and a storage 930.

Meanwhile, embodiments disclosed in the specification and drawings are merely presented specific examples to easily explain the technical contents of the disclosure and help the understanding of the disclosure, and it is not intended to limit the scope of the disclosure. That is, it will be apparent to those skilled in the art that modifications based on the technical solution of the disclosure can be implemented. In addition, the above-described embodiments may be combined with each other if necessary. For example, the base station and the terminal can be operated using any combination of the embodiments of the disclosure.

While the disclosure has been described in detail with reference to specific embodiments, it is to be understood that various changes and modifications may be made without departing from the scope of the disclosure. Therefore, the scope of the disclosure should not be limited by embodiments described herein, but should be determined by the scope of the appended claims and equivalents thereof.

What is claimed is:

1. A power headroom information transmission method of a terminal in a wireless communication system supporting beamforming, the method comprising:

identifying a downlink path loss at a transmission time of a last transmission of first power headroom information;

determining transmission of second power headroom information in case that the downlink path loss has changed more than a predetermined threshold value; and transmitting, to a base station, the second power headroom information in case that the transmission of the second power headroom information is determined.

2. The method of claim 1, wherein the determining includes:

determining a first downlink beam group including at least one downlink beam having a signal strength greater than or equal to a first predetermined threshold value among downlink beams contained in the first power headroom information;

checking a change in a downlink path loss value of each downlink beam belonging to the first downlink beam group; and determining transmission of the second power headroom information in case that the change in the downlink path loss value of each downlink beam is greater than or equal to the predetermined threshold value.

3. The method of claim 1, wherein the determining includes:

determining a second downlink beam group including at least one downlink beam having a signal strength smaller than or equal to a second predetermined threshold value among downlink beams contained in the first power headroom information;

checking a change in a downlink path loss value of each downlink beam belonging to the second downlink beam group; and determining transmission of the second power headroom information in case that the change in the downlink path loss value of each downlink beam is greater than or equal to the predetermined threshold value.

4. The method of claim 1, wherein the determining includes:

determining an average value of downlink path loss values of downlink beams contained in the first power headroom information;

checking a change in the average value; and determining transmission of the second power headroom information when the change in the average value is greater than or equal to a predetermined threshold value.

5. The method of claim 1, wherein the determining includes:

receiving configuration information including index information of a downlink beam for beam measurement from a base station;

measuring a downlink beam, based on the configuration information; and determining transmission of the second power headroom information when index information of the measured downlink beam is different from the index information of the downlink beam contained in the configuration information.

6. The method of claim 1, wherein the determining includes:

receiving a message for a downlink beam change from a base station; and determining transmission of the second power headroom information when an elapsed time after receiving the message exceeds a predetermined reference value.

7. The method of claim 1, wherein the transmitting includes transmitting the second power headroom information to the base station by using a predetermined format, and wherein the predetermined format includes index information of each downlink beam and power headroom information for each downlink beam.

8. The method of claim 7, wherein the predetermined format includes indicator information indicating whether to perform a back-off operation to lower transmission power of the terminal.

9. A terminal in a wireless communication system supporting beamforming, the terminal comprising:

a transceiver; and a controller configured to:

identify a downlink path loss at a transmission time of a last transmission of first power headroom information, determine transmission of second power headroom information in case that the downlink path loss has changed more than a predetermined threshold value, and control the transceiver to transmit, to a base station, the second power headroom information in case that the transmission of the second power headroom information is determined.

10. The terminal of claim 9, wherein the controller is further configured to:

determine a first downlink beam group including at least one downlink beam having a signal strength greater than or equal to a first predetermined threshold value among downlink beams contained in the first power headroom information, check a change in a downlink path loss value of each downlink beam belonging to the first downlink beam group, and determine transmission of the second power headroom information when the change in the downlink path loss value of each downlink beam is greater than or equal to the predetermined threshold value.

11. The terminal of claim 9, wherein the controller is further configured to:

determine a second downlink beam group including at least one downlink beam having a signal strength smaller than or equal to a second predetermined threshold value among downlink beams contained in the first power headroom information, check a change in a downlink path loss value of each downlink beam belonging to the second downlink beam group, and determine transmission of the second power headroom information when the change in the downlink path loss value of each downlink beam is greater than or equal to the predetermined threshold value.

12. The terminal of claim 9, wherein the controller is further configured to:

determine an average value of downlink path loss values of downlink beams contained in the first power headroom information, check a change in the average value, and determine transmission of the second power headroom information when the change in the average value is greater than or equal to a predetermined threshold value.

13. The terminal of claim 9, wherein the controller is further configured to:

control the transceiver to receive configuration information including index information of a downlink beam for beam measurement from a base station, measure a downlink beam, based on the configuration information, and determine transmission of the second power headroom information when index information of the measured downlink beam is different from the index information of the downlink beam contained in the configuration information.

14. The terminal of claim 9, wherein the controller is further configured to:

control the transceiver to transmit the second power headroom information to the base station by using a predetermined format, wherein the predetermined format includes index information of each downlink beam and power headroom information for each downlink beam.

15. The terminal of claim 14, wherein the predetermined format includes indicator information indicating whether to perform a back-off operation to lower transmission power of the terminal.

* * * * *